(12) United States Patent
Tsuyuguchi et al.

(10) Patent No.: US 6,289,397 B1
(45) Date of Patent: Sep. 11, 2001

(54) DISK DRIVE OR LIKE PERIPHERAL STORAGE DEVICE ADAPTED FOR FIRMWARE UPGRADING, SELF-TESTING, ETC.

(75) Inventors: Hiroshi Tsuyuguchi, Tokyo; Tsuyoshi Osawa, Tanashi; Satoshi Nakamura, Tachikawa; Sadao Yabuki, Hinode-machi, all of (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/326,423

(22) Filed: Jun. 4, 1999

(30) Foreign Application Priority Data

Jun. 12, 1998 (JP) .................................................. 10-181568

(51) Int. Cl.[7] ....................................................... G06F 9/06
(52) U.S. Cl. ........................... 710/1; 710/2; 710/3; 710/4; 710/5; 710/6; 710/36; 711/1; 711/4; 711/5; 711/102; 711/103; 711/115
(58) Field of Search ........................ 710/1–5, 36; 711/1, 711/4, 5, 102–103, 115

(56) References Cited

U.S. PATENT DOCUMENTS

| | | | |
|---|---|---|---|
| 5,596,738 | 1/1997 | Pope | 395/430 |
| 5,664,219 * | 9/1997 | Glassen et al. | 710/5 |
| 5,812,857 * | 9/1998 | Nelson et al. | 395/712 |
| 6,055,632 * | 4/2000 | Deegan et al. | 713/100 |
| 6,170,043 * | 1/2001 | Hu | 711/158 |
| 6,237,091 * | 5/2001 | Firooz et al. | 713/1 |

* cited by examiner

Primary Examiner—Than Nguyen
(74) Attorney, Agent, or Firm—Woodcock Washburn Kurtz Mackiewicz & Norris LLP (57) ABSTRACT

A flexible magnetic disk drive is disclosed which is linked to a computer via a universal serial bus interface having firmware held on a read-only memory. In order to facilitate the upgrading of the firmware, an electrically erasable, programmable ROM is employed for firmware storage. Each new firmware version is issued in the form of a flexible magnetic disk which may be loaded in the disk drive just like an ordinary data disk, only with the disk drive disconnected from the computer as far as data transmission is concerned. The EEPROM is preprogrammed to identify the loaded firmware disk, erase the old firmware version on the ROM, and write the new version thereon. In another embodiment a self-testing program disk is employed in place of the firmware disk, for performing a set of tests on the disk drive including the interface. The tests are conducted automatically as the self-testing program disk is loaded in the disk drive, again with the disk drive disconnected from the computer.

13 Claims, 9 Drawing Sheets

DISK DRIVE OR LIKE PERIPHERAL STORAGE DEVICE ADAPTED FOR FIRMWARE UPGRADING, SELF-TESTING, ETC.

BACKGROUND OF THE INVENTION

This invention relates to a data storage device to be interfaced with a computer as a peripheral, and more specifically to such a device adapted for use not only with usual storage media for storing computer data but with those having prewritten thereon programs or software that is not used by the computer, such as a new version of interfacing firmware and a self-testing program for the peripheral.

Examples of the data storage device envisaged by the present invention include, but are not limited to, all such currently known devices as flexible magnetic disk drives, CD-ROM drives, optical disk drives, magneto-optical disk drives, and magnetic tape transports, all such devices being alike in their potential capability of use with the noted two different kinds of storage media.

There recently have been introduced to the market the personal computers that have what is called a universal serial bus (USB) port for connection of peripherals via serial USB interfaces. A plurality of peripherals, each with a USB interface, may be connected what is termed a USB hub via separate USB cables and thence to the USB port of the computer via a single USB cable. USB connections are acknowledged to greatly enhance the versatility of computer systems.

The USB interface, which may, or may not, be built into each peripheral, includes a central processor unit, a random access memory, a read-only memory, etc. For adapting the peripheral to the specific computer in use, the USB interface ROM stores system software commonly known as firmware. Computer manufacturers and users alike have experienced difficulties in changing the ROM firmware, usually in upgrading it to a later version. The following two methods have so far been available for this purpose:

1. Replacing the ROM itself by a new one holding the new version.

2. Building an electrically erasable programmable ROM (EEPROM), instead of a simple nonprogrammable ROM, into the USB interface for firmware storage, permitting the user to rewrite the firmware as the need arises.

The first described method involves the trouble of sending the complete peripheral to the manufacturer or to the authorized service shop at the costs of considerable time, labor and expense. Although this trouble is absent from the second method, reprogramming by the user himself is no easy task, with a high likelihood of write errors being introduced into the firmware, potentially seriously affecting the performance of the peripheral or of the complete computer system.

SUMMARY OF THE INVENTION

The present invention seeks to make a data storage device, which is to be connected to a computer as a peripheral, capable of interchangeable use with a first kind of storage medium for storing data used by the computer and a second kind of storage medium storing data not used by the computer, thereby enabling the data storage device to utilize the second kind of storage medium for its own purposes, totally independently of the computer.

The present invention further seeks to apply the above fundamental concept to firmware upgrading or rewriting and, in so doing, to overcome all the inconveniences encountered with the listed conventional methods.

The present invention also seeks to apply the above fundamental concept to the self-testing of the data storage device including an interface.

Most broadly, the invention may be summarized as a data storage device to be connected to a computer via connector means, for interchangeable use with a first kind of storage medium for storing data used by the computer and a second kind of storage medium storing data not used by the computer. The data storage device comprises: (a) data transfer means for data transfer with the first or the second kind of storage medium as these media are interchangeably loaded in the data storage device, the data transfer means being capable of at least reading the first or the second kind of storage medium; (b) means for determining whether or not the data storage device is connected to the computer in terms of data transmission, in order to permit the data storage device to operate under the control of the computer when the data storage device is determined to be connected to the computer; (c) means for identifying the storage medium loaded in the data storage device; and (d) means for causing the data transfer means to read the loaded storage medium when the data storage device is determined to be not connected to the computer and, at the same time, when the loaded storage medium is identified as being of the second kind.

Preferably, the first kind of storage medium is a standard data storage medium, and the second kind a software storage medium, both in disk form to be loaded interchangeably in the disk drive. The software storage medium takes the form of a firmware disk, storing a new interfacing firmware version, in one embodiment of the invention, and a self-testing program disk for the data storage device (i.e. disk drive) in another. The self-testing program disk has prewritten thereon a set of diagnostic tests to be conducted on various components and operations of the disk drive including the interface.

Thus, stated in another aspect thereof, the present invention concerns a data storage device, to be interfaced with a computer, for interchangeable use with a data storage medium and a firmware storage medium, the latter holding a new version of interfacing firmware. The device comprises: (a) interface means including an erasable, programmable memory on which is stored an old version of interfacing firmware; (b) means for determining whether or not the data storage device is connected to the computer in terms of data transmission, in order to permit the data transfer means to make data transfer with the data storage medium under the control of the computer when the data storage device is determined to be connected to the computer; (c) means for identifying the loaded storage medium as a firmware storage medium when the data storage device is determined to be not connected to the computer; and (d) means for replacing the old firmware version on the memory of the interface means by the new version on the firmware storage medium when the data storage device is determined to be not connected to the computer and, at the same time, when the loaded storage medium is identified as a firm-ware storage medium.

The invention utilizes a reprorgrammable ROM for interfacing firmware storage like the prior art but, unlike the prior art, in combination with a firmware storage medium holding the new firmware version. The user may therefore simply insert the firmware disk in the disk drive, disconnect the disk drive from the computer, and electrically turn on the disk drive. Thereupon the old firmware version on the ROM will be automatically replaced by the new version read out from the disk according to the firmware rewrite program which has been factory introduced into the ROM.

The user no longer needs to send his machine to the manufacturer or to the local service shop for having the firmware updated. The manufacturers themselves are certain to benefit immensely from this invention, since all they have to do each time they issue a new firmware version is mail the firmware disks to the users.

Still another aspect of the invention concerns the use of a self-testing program disk instead of the firmware disk. For testing the components and operations of the storage device, including the interface, by this self-testing disk, the user may insert that disk in the disk drive, disconnect the disk drive from the computer, and electrically turn on the disk drive. Upon subsequent identification of the self-testing disk as such, the self-testing program will be transferred from the disk to an internal memory of the device, and the prescribed sets of diagnostic tests will be implemented accordingly. The user need not operate the computer in any way, it being disconnected from the disk drive during the testings.

The transfer of the self-testing program from disk to memory is necessary because the tests include the formatting of the disk. Upon completion of the tests the program may be rewritten on the disk, preferably together with the results of the tests.

The above and other objects, features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Currently, the present invention is believed to be best embodied in a three-and-a-half-inch floppy disk drive (FDD) which is USB interfaced with a personal computer. Further, in this particular embodiment, the FDD will be disclosed as adapted for interchangeable use with both a floppy disk for storing computer data and a floppy disk on which is prewritten a newly issued version of firmware for use in the USB interface forming part of the FDD.

Figure 1:
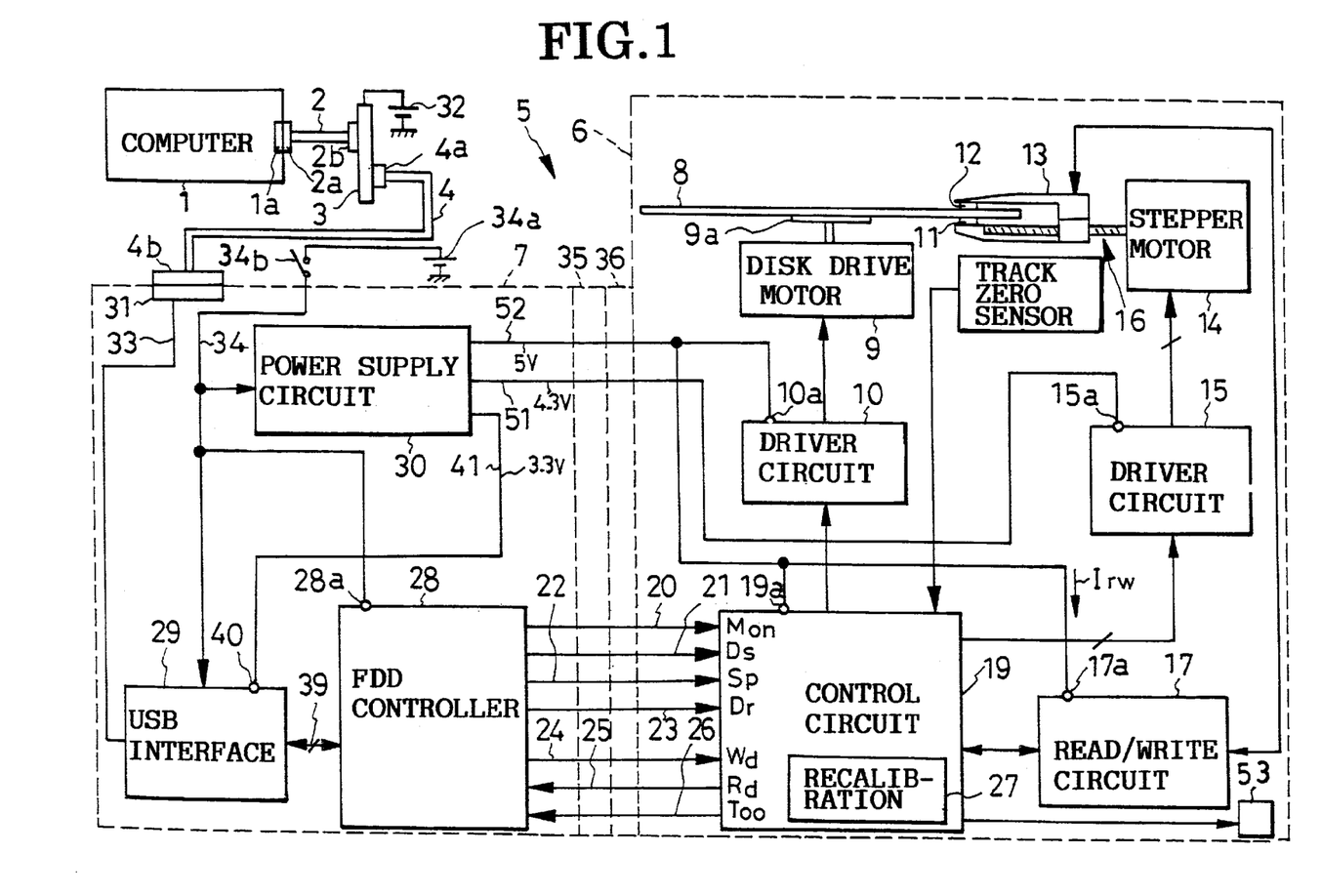
FIG. 1 is a block diagram of a computer system representing a typical application of the principles of the present invention, the computer system including a flexible magnetic disk drive as a peripheral data storage device.

At 1 in FIG. 1 is shown in block form a personal computer conventionally equipped with a USB connector 1a for connection, via a USB cable 2, a USB hub 3, and another USB cable 4, to a peripheral data storage device herein shown as an FDD 5. It is understood that, aside from the USB port, the exemplified personal computer is of any known or suitable design, possibly complete with such standard equipment as a keyboard, a hard disk drive (HDD), a CD-ROM drive, and a display, all not shown because of their irrelevance to this invention.

The USB cable 2 is shown to have a connector 2a coupled to the connector 1a on the computer 1 and another connector 2b to the USB hub 3. The other USB cable 4 is likewise shown to have a connector 4a coupled to the USB hub 3 and another connector 4b to the disk drive 5. As is well known, the USB cable is a combination of two power conductors and two signal conductors. The USB hub 3 is conventionally equipped with a power supply 32 for powering the peripherals connected thereto via the power buses of the USB cables. However, in this particular embodiment of the invention, the FDD 5 is self-powered, having a dedicated power supply, and does not need the power conductors included in the USB cable 4, as will be later referred to in more detail.

The FDD 5 is shown divided into a data storage section 6 and an interface section 7. For data transfer with a replaceable, double-sided flexible magnetic disk 8, the data storage section 6 is shown to conventionally comprise an electric disk drive motor 9 for imparting rotation to the disk, a motor driver circuit 10 for controllably driving the motor, a pair of transducers or magnetic heads 11 and 12 for reading and writing data on the opposite sides of the disk, a carriage 13 carrying the transducers, a stepper motor 14 controllably driven by a driver circuit 15 and coupled to the transducer carriage 13 via a motion translating mechanism such as a lead screw 16 for moving the transducers across the tracks on the disk and positioning them on any desired track position, a read/write circuit 17 connected to both transducers, an optoelectronic Track Zero sensor 18, and a control circuit 19 for controlling the motor driver circuits 10 and 15 and the read/write circuit 17.

Inserted into the FDD 5, the disk 8 is loaded on a turntable 9a mounted fast to a spindle which is shown coupled directly to the disk drive motor 9 for joint rotation therewith. The disk is to rotate at 300 or 360 revolutions per minute during reading or writing. Connected between disk drive motor 9 and control circuit 19, the motor driver circuit 10 sets the motor into rotation in response to a MOTOR ON signal from the control circuit.

The stepper motor driver circuit 15 causes the stepper motor 14 to rotate by discrete increments in either of two opposite directions for positioning the transducers 11 and 12 on any desired track position on the disk. The control circuit 19 delivers both stepping pulses and stepping direction signal to the driver circuit 15.

Connected between both transducers 11 and 12 and the control circuit 19, the read/write circuit 17 includes means for processing data read from the disk 8, and means for processing data to be written. The processed read data is sent to the control circuit 19, and the write data is received therefrom.

The Track Zero sensor 18 is of known construction capable of optoelectronically sensing, from the position of the transducer carriage 13, the fact that the transducers 11 and 12 are positioned on the outmost Track Zero on the disk 8. The output from the sensor 18 is directed to the control circuit 19.

The control circuit 19 is connected to the FDD interface section 7 for inputting therefrom a MOTOR ON signal Mon, a DRIVE SELECT signal Ds, stepping pulses Sp, a stepping direction signal Dr, and write data Wd over lines 20, 21, 22, 23 and 24, respectively. In response to these input signals the control circuit 19 controls the various parts of the FDD data storage section 6 in order to cause the write data WD to be written on the disk and the data on the disk to be read. Further the control circuit 19 sends the read data Rd and Track Zero signal Too to the FDD interface section 7 by way of lines 25 and 26, respectively. Actually, there are many more standard signal lines between data storage section 6 and interface section 7 of the FDD 5 but are not shown because of impertinence to the instant invention.

Recalibration circuit means 27 are conventionally built into the control circuit 19 for automatically positioning the transducers 10 and 11 on Track Zero during a preassigned period of time following the predetermined startup period of the disk drive motor 9 when the computer system is powered on or after a disk has been loaded into the FDD. The recalibration means 27 internally produce stepping pulses for delivery to the stepper motor driver circuit 15, as distinguished from the externally supplied stepping pulses Sp.

Typically, the FDD interface section 7 may take the form of an interface board, having an FDD controller 28, a USB interface 29, and a supply circuit 30 mounted on a printed circuit board. The USB interface 29 is connected by way of a line 33 to a connector 31 to which there is detachably coupled the noted connector 4b on one end of the USB cable 4 leading to the USB hub 3. The line 33 is understood to represent two signal lines connected respectively to the two signal lines of the USB cable 4.

As has been mentioned, the FDD 5 is self-powered in this particular embodiment, instead of being powered by the USB power bus in the cable 4, having a supply line 34 connecting the supply circuit 30 to a five-volt direct-current power supply 34a via an on/off switch 34b. The d.c. power supply 34a may be either a battery or a rectifier connected to a commercial alternating-current power outlet. In the latter case the switch 34b may be unnecessary if the user is to be advised to use the plug connection to the commercial a.c. outlet as switch.

Notwithstanding the showing of FIG. 1, the USB cable 4 could be coupled directly to the USB port la of the computer 1, instead of via the USB hub 3. Use of this hub is recommended because in one standard design it has as many as four outlets, permitting joint connection of as many USB cables and, therefore, as many peripherals. The data storage section 6 and interface section 7 of the FDD 5 are interconnected via connector halves 35 and 36, although cable connection between them is of course possible.

Itself well known in the disk drive art, the FDD controller 28 puts out the noted MOTOR ON signal Mon. DRIVE SELECT signal Ds, stepping pulses Sp, stepping direction signal Dr, and write data Wd, for delivery to the control circuit 19 of the FDD data storage section 6 over the lines 20–24, and inputs the read data Rd and Track Zero signal Too from the FDD data storage section over the lines 25 and 26. The FDD controller 28 has a supply terminal 28a connected to the five-volt supply line 34.

The USB interface 29 has its input connected as aforesaid to the USB port of the computer 1, and its output to the FDD controller 28 via a bus 39. The USB interface 29 has another input connected to the five-volt supply line 34 for sensing the fact that the FDD 5 is electrically turned on. The supply terminal 40 of the USB interface 29 is connected to a 3.3-volt output line 41 of the supply circuit 30.

Figure 2:
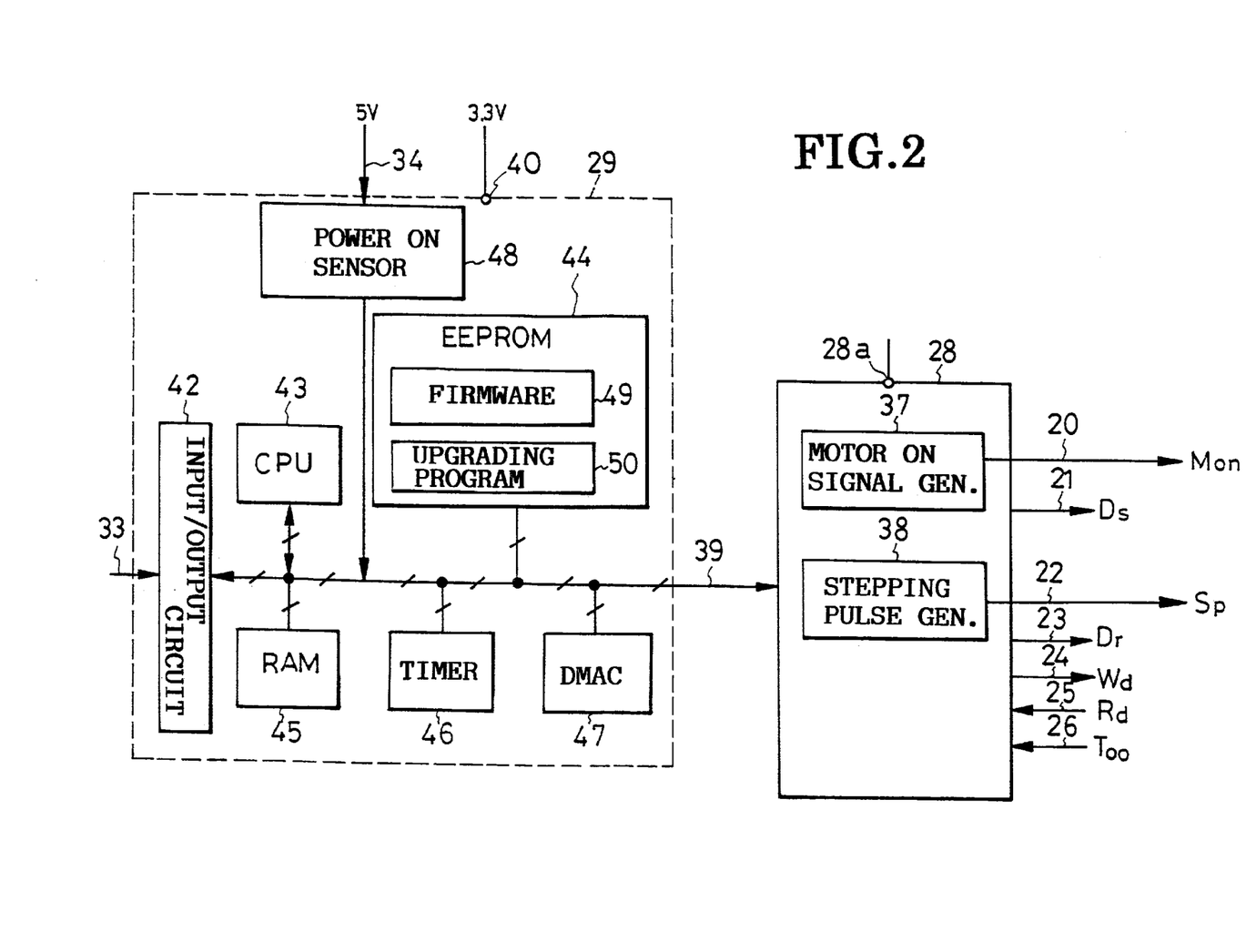
FIG. 2 is a block diagram of the USB interface and disk drive a controller included in the interface section of the disk drive in the FIG. 1 computer system.

As illustrated in more detail in FIG. 2, the USB interface 29 comprises an input/output circuit 42 connected to the serial transmission signal line 33, a central processor unit (CPU) 43, an electrically rewritable nonvolatile memory or electrically erasable programmable read-only memory 11 (EEPROM) 44, a random access memory (RAM) 45, a timer 46, a direct memory access controller (DMAC) 47, and a POWER ON sensor circuit 48, all connected to a bus 39 by which the USB interface 29 is connected to the FDD controller 28 for bidirectional signal transmission therewith. The USB interface 29 adapts the serial data of USB specifications to the FDD controller 28, and the FDD controller output data to the USB specifications.

The CPU 43, ROM 44 and RAM 45 are shown in FIG. 2 as being included in the interface 29 by way of example only; in practice, any one, two, or all of these components could be included in the FDD controller 28.

As indicated in block form in FIG. 2, the EEPROM 44 has a location 49 where the USB interface firmware or microprogram is stored, and another location 50 where an FDD startup and firmware upgrading program is stored according to the present invention. The program in the EEPROM location 50 contains a startup subroutine for the FDD 5 and another subroutine for rewriting or upgrading the firmware in the EEPROM location 49, as will be later detailed with reference to FIGS. 5 and 6.

The CPU 43 and RAM 45 of the USB interface 29 are both used for implementation of the firmware and the FDD startup and firmware upgrading program. The timer 46 is used, among other purposes, for ascertaining whether the FDD 5 is USB linked to the computer 1 or not in the execution of the startup and firmware upgrading program according to the present invention. The DMAC 47 controls DMA data transfer.

The POWER ON sensor circuit 48 of the USB interface 29 is connected to the supply line 34, shown also in FIG. 1, in order to ascertain whether or not power transmission to the FDD 5 has started. The POWER ON signal from this sensor circuit 48 is given to both the interface CPU 43 and the recalibration means 27, FIG. 1, of the FDD control circuit 19. Despite the showing of FIG. 2, the POWER ON sensor circuit 48 need not necessarily be included in the interface 29 but may be made a part of, for instance, the control circuit 19.

Out of the various standard circuit means included in the FDD controller 28, only a MOTOR ON signal generator 37 and a stepping pulse generator 38 are shown in FIG. 2. All other signal generating means and data processing means included in the FDD controller 28 are not shown because of their well known nature and impertinence to the present invention.

With reference back to FIG. 1 the supply circuit 30 has an input connected to the five-volt supply line 34 and has a 3.3-volt output line 41, 4.3-volt output line 51, and 5.0-volt output line 52. The 3.3-volt output line 41 is connected to the supply terminal 40 of the USB interface 29. The 4.3-volt output line 51 is connected to the supply terminal 15a of the stepper motor driver circuit 15. The 5.0-volt output line 52 is connected to all of the supply terminal 10a of the disk drive motor driver circuit 10, the supply terminal 17a of the read/write circuit 17, and the supply terminal 19a of the control circuit 19. The voltage applied to the stepper motor 14 is made lower than that to the disk drive motor 9 in order to realize low current energization of the disk drive motor. It is understood that the supply circuit 30 is conventionally furnished with switches, not shown, for on/off control of power fed over the output lines 51 and 52 in order to avoid the concurrent application of starting currents to both motors 9 and 14.

Preferably, and as indicated at 53 in FIG. 1, the FDD 5 is provided with a pilot lamp, which in practice may take the form of a light emitting diode connected to the control circuit 19, for visually indicating the fact that the disk 8 is being accessed. Additionally, according to the present invention, the pilot lamp 53 is also to glow when new firmware is being written on the EEPROM 44, FIG. 2, of the USB interface 29 in a manner to be detailed subsequently. The pilot lamp 53 may be made to blink upon completion of firmware writing, informing the user of that fact.

It is understood that the disk shown in FIG. 1 and therein designated 8 is what may be called for convenience a "data disk," that is, a standard, commercially available disk for holding computer data for use by the computer 1. The invention also presupposes the use, in this particular embodiment, of a disk storing a newly issued version of interfacing firmware, by which the one currently stored on the USB interface EEPROM 44 of the computer system owned by the user is to be supplanted by the user himself, as taught by the instant invention. Such a disk will be hereinafter referred to as the "firmware disk" in contradistinction 1l from the data disk 8. Both data disk and firmware disk are exactly of the same mechanical design and may therefore be put to use interchangeably.

Figure 3:
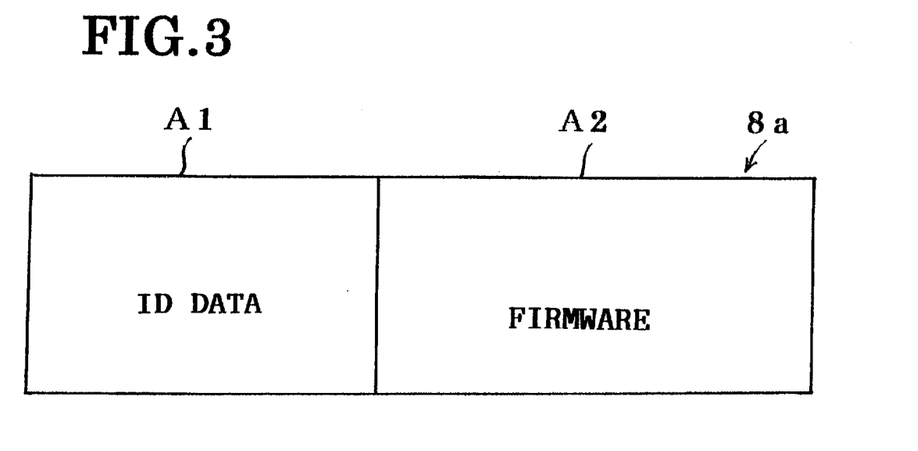
FIG. 3 is an illustration explanatory of a firmware disk for use with the FIG. 1 disk drive for upgrading the interfacing firmware in the FIG. 2 interface section of the disk drive.

As indicated block diagrammatically in FIG. 3, the firmware disk 8a has a region $A_1$ for holding self-identifying data indicative of the fact that this is a firmware disk, and a region $A_2$ for storing the new firmware version. The self-identification region $A_1$ exists on Sector One, Track Zero on Side 0 of the disk.

Operation

The FDD 5 may be connected to the computer 1 via the USB cables 2 and 4 and USB hub 3, just as shown in FIG. 1, in use of the FDD as external data storage of the computer. With the data disk 1 loaded on the turntable, the power switch 34b may be closed for setting the disk drive motor 9 into rotation. Computer data will be written on, and read from, the data disk 1 by the transducers 11 and 12 in the usual manner.

The FDD 5 must be electrically disconnected from the computer 1, at either of the four USB connections depicted in FIG. 1, for upgrading the firmware on the USB interface EEPROM 44. Then the firmware disk 8a may be inserted in the FDD 5, and the power switch 34b turned on. Thereupon, sensing the five-volt power being fed over the line 34, the POWER ON sensor circuit 48, FIG. 2, built into the USB interface 29 will invoke the startup and firmware upgrading program stored in the location 50 of the USB interface EEPROM 44. More specifically, inputting the POWER ON signal from the sensor circuit 48, the USB interface CPU 43 will cause the startup and firmware upgrading program to be read from the EEPROM 44 and stored on the RAM 45. Thereafter the FDD 5 will automatically start up, and the firmware rewritten on the EEPROM 44, according to this program.

Figure 5:
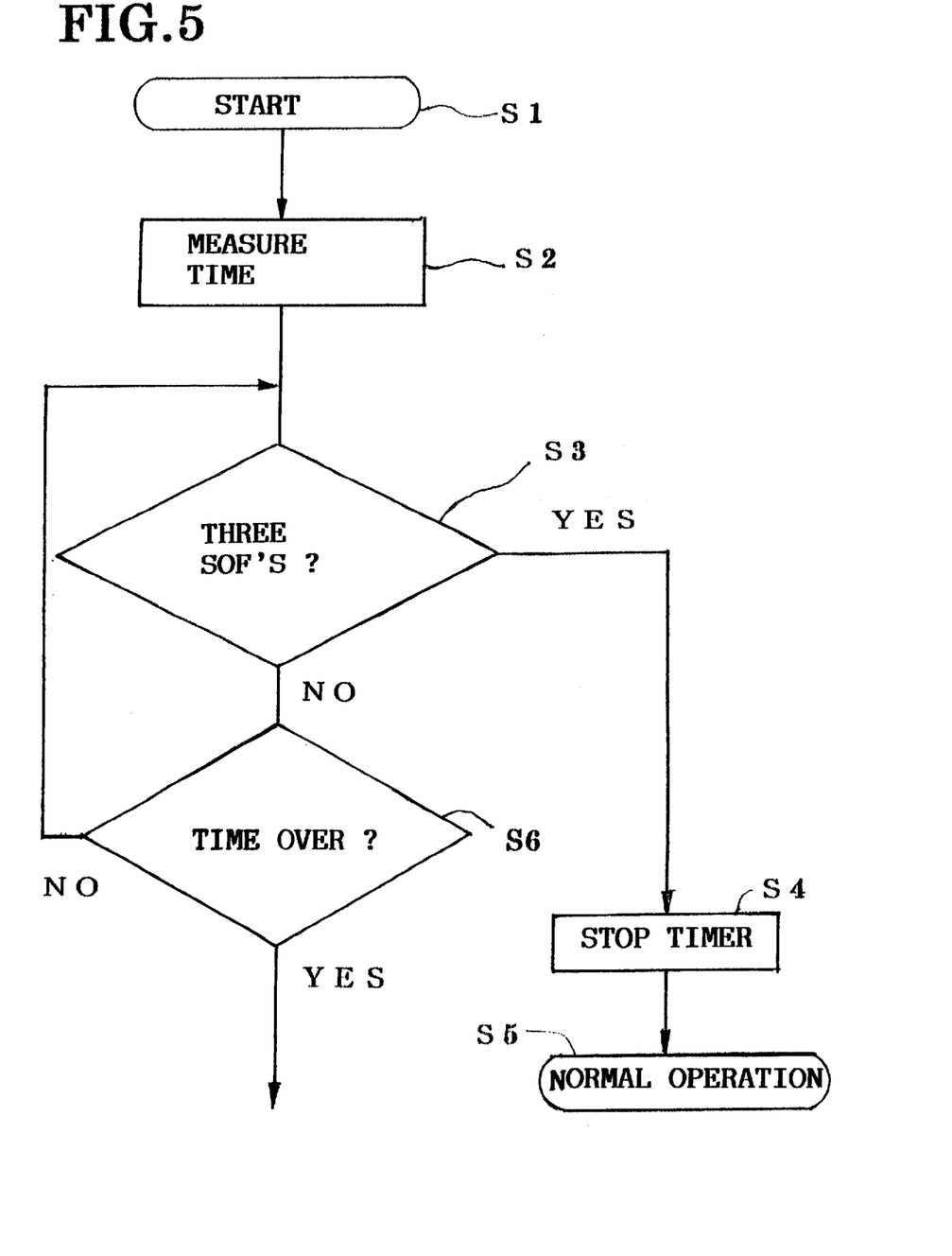
FIGS. 5 and 6 show in combination the flowchart of the disk drive startup and firmware upgrading program.
Figure 6:
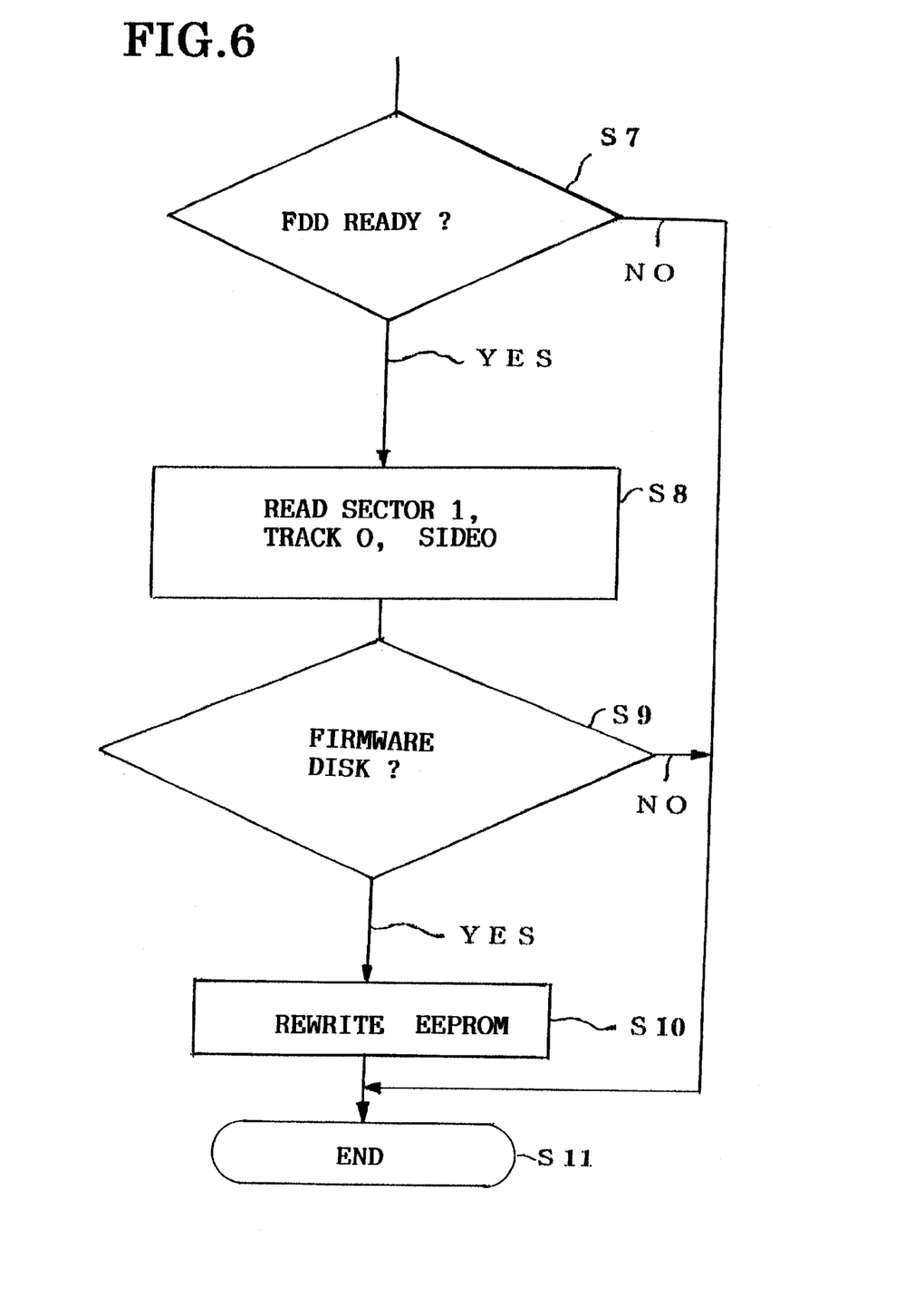

FIGS. 5 and 6 show in combination the flowchart of the startup and firmware upgrading program. As the program starts at $S_1$, a preas-signed length of time of, typically, five seconds, is measured at $S_2$ by the timer 46, FIG. 2, included in the USB interface 29. It is questioned at $S_3$ whether three consecutive SOF (start of a frame) packets have been detected during the five seconds being measured.

Figure 4:
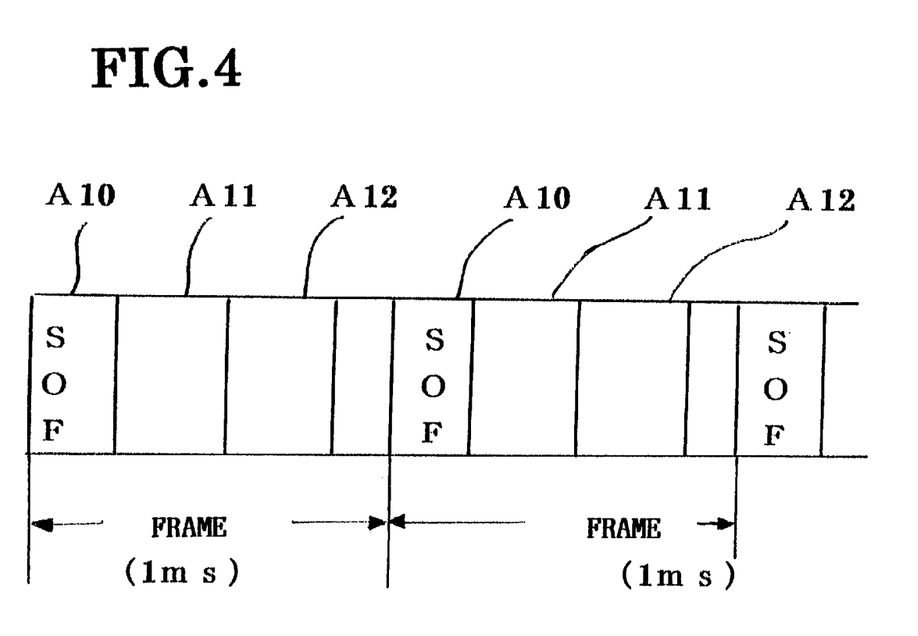
FIG. 4 is an illustration explanatory of a frame signal supplied from the computer to peripherals that are USB linked thereto, the frame signal being used for determination of whether the FIG. 1 disk drive is connected to the computer or not in the execution of a disk drive start-up and firmware upgrading program according to this invention.

It is understood that the computer 1 is conventionally equipped to produce what may be termed a frame signal for time-division multiplexing of data transfer between the computer and the two or more peripherals coupled thereto via the USB links. By the term "frame signal" is meant that which is diagrammatically indicated in FIG. 4, having a series of frames each one millisecond long. Each frame is subdivided into an SOF subframe $A_{10}$, a first peripheral subframe $A_{11}$ assigned to the first peripheral, a second peripheral subframe $A_{12}$ assigned to the second peripheral, etc.

Let it be assumed that, contrary to what has been said above, the computer 1 is now USB linked to the FDD 5 as in FIG. 1 Then, at $S_3$ in FIG. 5, three SOFs will be detected during the five seconds following the closure of the power switch. The answer "yes" to the $S_3$ question will lead the program to $S_4$, at which the five second measurement by the timer 46 will be suspended immediately upon detection of the three consecutive SOFs. The existing firmware on the USB interface EEPROM 44 will then be read out for storage on the RAM 45. Normal data transfer between computer 1 and FDD 5 will be started according to $S_5$. The steps $S_3$–$S_5$ are therefore the normal startup subroutine of the FDD 5, not necessarily associated with firmware upgrading.

No SOFs will be detected, of course, during the five seconds when the FDD 5 is not connected to the computer 1, as has been assumed above. The steps $S_2$, $S_3$ and $S_6$ are meant to confirm this non-connection.

It is then questioned at $S_7$ whether the FDD 5 is ready for reading and writing, that is, whether a disk is loaded on the turntable 9a and, at the same time, the transducers 11 and 12 positioned on Track Zero. The FDD 5 is understood to include a disk sensor, not shown, for informing the control circuit 19 of the loading of the disk 8 or 8a on the turntable 9a. The Track Zero sensor, capable of optically sensing the positioning of the transducers 11 and 12 on Track Zero on the loaded disk, is shown at 18 in FIG. 1. The standard practice in the disk drive art is automatically to position the transducers on Track Zero when the FDD is powered on, as by the closure of the power switch 34b; under the direction of the FDD control circuit 19, notably, its recalibration means 27.

If the FDD 5 proves to be not ready at $S_7$, the possible reason may be that no disk is loaded on the turntable 9a. This program is therefore immediately terminated at $S_{11}$ in this case.

If the FDD 5 is found ready, on the other hand, then Sector One, Track Zero, Side Zero of the disk is read at $S_8$ for retrieving therefrom the self-identifying data, FIG. 3, of the firmware disk which is assumed to be prewritten in that location. The self-identifying data may be, for example, "TEAC USB-FDD UPDATE PROGRAM VER. 1.0". At $S_9$ the loaded disk is identified on the basis of the retrieved self-identifying data. If the loaded disk is a proper firmware disk, the self-identifying data read out therefrom will agree with the one that has been registered on the ROM 44, perhaps together with one or more other software disks to be handled like the firmware disk. It is among the functions of the CPU 43, FIG. 2, built into the USB interface 29 to compare the recovered self-identifying data with that of the preexisting firmware. The program will be cut short if an appropriate firmware disk, or other appropriate software disk, proves to be not loaded at $S_9$.

Upon agreement of the recovered self-identifying data with that of the current firmware on the ROM 44, the desired new firmware is read out from the firmware disk at $S_{190}$ for temporary storage on the RAM 45, FIG. 2. Further, at this same step $S_{10}$, the old firmware is erased from the USB interface EEPROM location 49, and the new firmware is written in its stead. Then the program comes to an end at $S_{11}$.

It will be appreciated that the firmware upgrading program is invoked simply as, with the FDD unlinked from the computer and a firmware disk loaded on the turntable, the power switch is turned on. No dedicated mechanical switch, which is fairly costly, needs to be added for firmware rewriting. It is also noteworthy that firmware rewriting takes place within the confines of the FDD, totally independent of, and unaffected by, the computer.

Second Form

Figure 7:
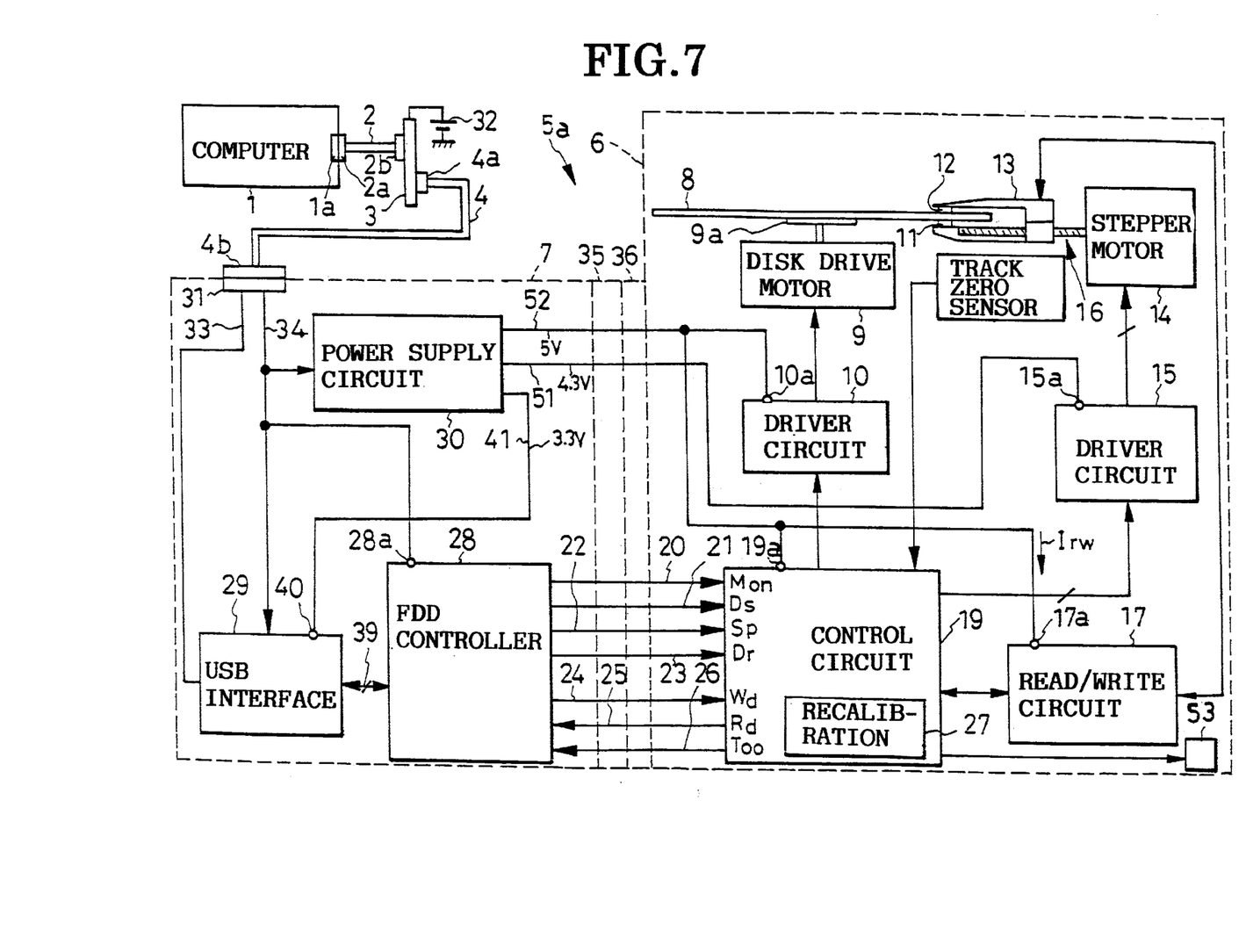
FIG. 7 is a diagram similar to FIG. 1 but showing an alternative form of computer system to which the present invention is applicable.

FIG. 7 illustrates an adaptation of the present invention to a bus-powered FDD 5a, instead of to the self-powered FDD 5 of the preceding embodiment. Itself conventional in the disk drive art, the bus-powered FDD 5a has its five-volt supply line 34 coupled to the FDD connector 31 for electrical connection to the five-volt power supply 32 by way of the power bus included in the USB cable 4 and the USB hub 3. The FDD 5a is identical with the FDD 5 in the other details of construction and operation including the startup and firmware upgrading program stored on the USB interface EEPROM.

The firmware upgrading of the USB interface 29 requires that the FDD 5a be electrically disconnected from the computer 1 according to the present invention. This objective is easy to attain by detaching the USB cable 4 from either the USB hub 3 or the FDD 5a, as in the first described embodiment of the invention. However, being not self-powered, the FDD 5a must be powered from the USB power supply 32 via a power cable, not shown, connected between USB hub 3 and FDD 5a Now the FDD 5a is under the same electrical conditions as when the first disclosed FDD 5 is unlinked from the computer and the power switch 34b closed. Consequently, with the loading of a proper firmware disk on the turntable 9a, the preexisting firmware of the USB interface 29 will be upgraded through the same procedure as above.

Third Form

The present invention will be of immense utility in use of a self-testing disk by which the user may test the various components and operations of the FDD, in addition to firmware disks as in the foregoing embodiments. An FDD self-testing disk may be put to use with the computer system of FIG. 1 only if the USB interface EEPROM is preprogrammed to allow such self-testing, possibly in addition to firmware upgrading.

Figure 8:
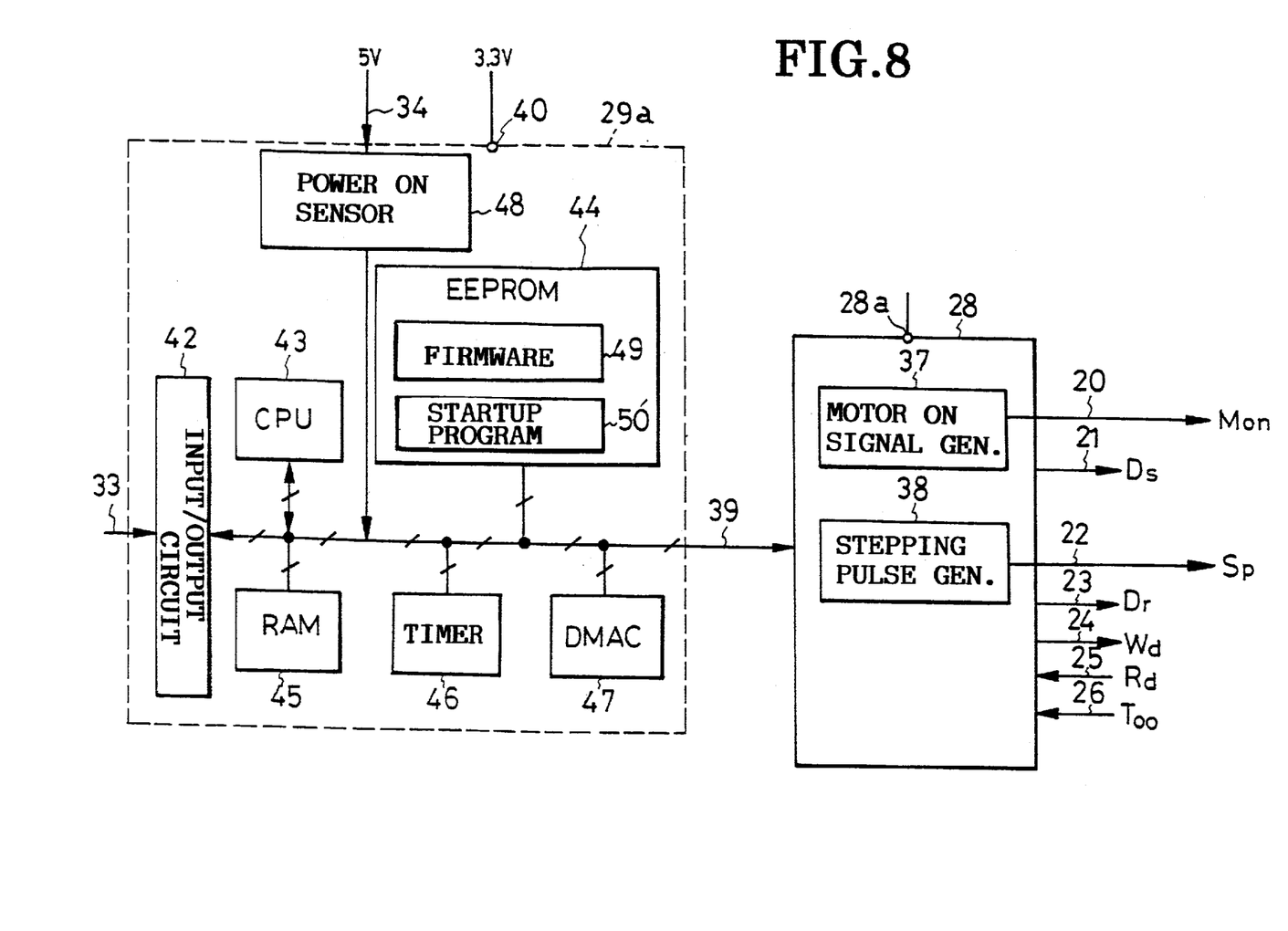
FIG. 8 is a diagram similar to FIG. 2 but showing an alternative USB interface according to the invention.

FIG. 8 shows a USB interface 29a including the EEPROM 44 holding a self-testing startup program 50', although this program is very much similar to the firmware upgrading program of FIGS. 5 and 6, as will become apparent as the description proceeds. The FIG. 8 interface 29a is akin to the first disclosed interface 29 in terms of hardware. The other constructional details of the FDD, and the manner of its connection to the computer, are therefore similar to those set forth above with reference to FIGS. 1 and 2.

The self-testing startup program is the one needed for automatically starting the FDD and making it ready for self-testing by the program written on the self-testing disk. Read out from the EEPROM 44 when the FDD is powered on, the self-testing startup program is held on the RAM 45 preparatory to execution.

Figure 9:
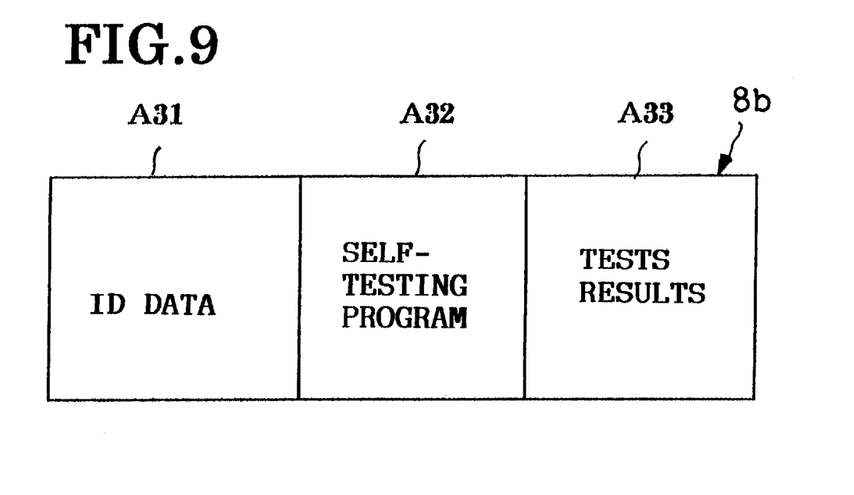
FIG. 9 is an illustration explanatory of a self-testing program disk for use with the disk drive including the FIG. 8 interface.

As indicated in FIG. 9, the self-testing disk 8b has a region a where self-identification data is written, a region $A_{32}$ where the self-testing program is written, and a blank $A_{33}$ where the results of the tests are to be recorded after the execution of the self-testing program. The self-identification data is that which identifies the self-testing disk as such. The self-testing program on the disk region $A_{32}$ may include tests on the following interface components and FDD operations:

1. CPU 43:

Commands are fed into the CPU 43, and its performance is evaluated from the results.

2. ROM 44 and RAM 45:

Reading from specific addresses of the ROM 44 and RAM 45, and writing on the RAM as well.

3. FDD controller 28, USB input/output circuit 42, and timer 46:

The components around the CPU 43 are tested for proper operations.

4. Formatting:

The self-testing disk is actually formatted, and the results evaluated. The disk formatting requires all the information that has been recorded on the disk to be transferred to the RAM 45 beforehand.

5. Reading and writing:

The first and the last blocks of the disk are tested by writing and reading data thereon.

Operation of Third Form

For testing a self-powered FDD by the self-testing disk 8b in a computer system such as shown in FIG. 1, the FDD 5 may first be disconnected from the computer 1 by detaching either the USB cable 2 or 4 from the computer or the USB hub or the FDD. Then the power switch 34b may be turned on thereby triggering off the self-testing startup program on the USB interface EEPROM 44.

Figure 10:
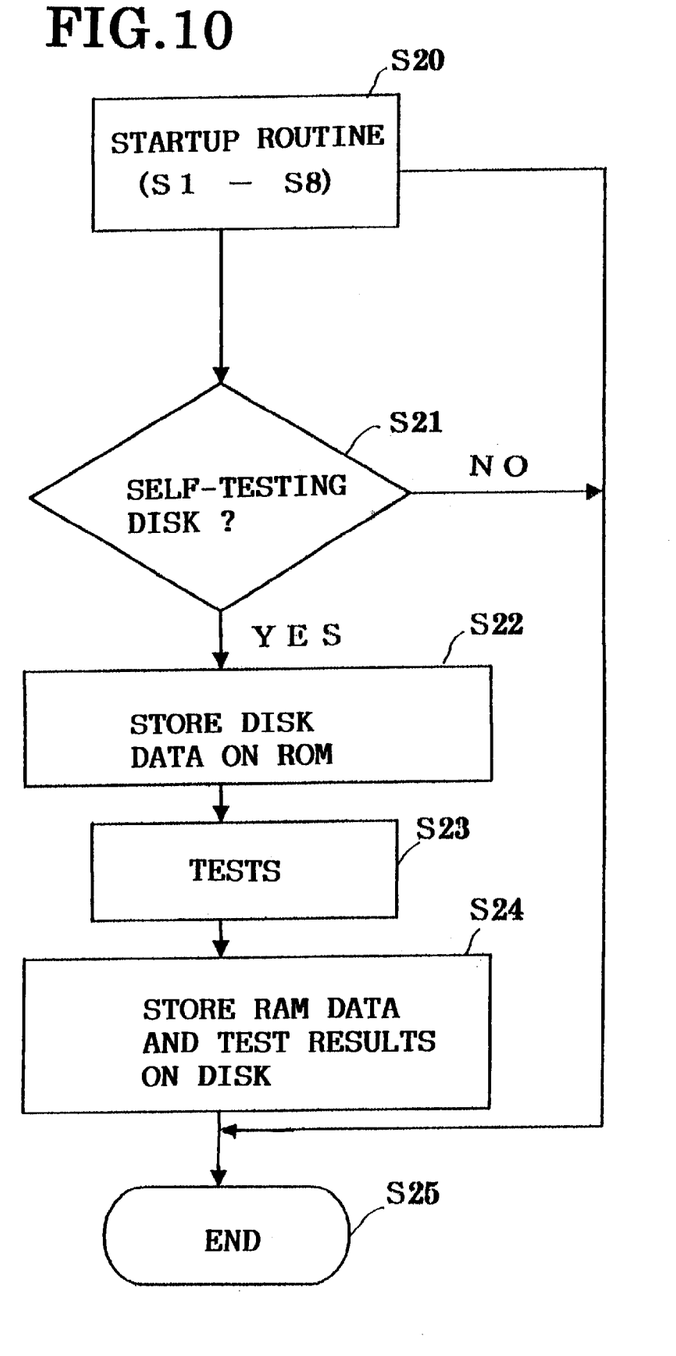
FIG. 10 is a flowchart of the program for implementing the self-testing program on the FIG. 9 disk.

Reference is now directed to FIG. 10 in which is flow-charted the self-testing startup program. At $S_{10}$ in this flowchart is Indicated the startup routine which is equivalent to steps $S_1$–$S_8$ of the firmware upgrading program in FIGS. 5 and 6. Therefore, at the end of this startup routine, the self-identifying data of the self-testing disk is understood to have been read on the location $A_{31}$, FIG. 9, of the disk. If the loaded disk proves to be a self-testing disk at the next step $S_{21}$, then at $S_{22}$ the whole data that has been written on this disk is transferred to and stored on the RAM 45, FIG. 8 of the USB interface 29a on a temporary basis.

Then the above listed tests are conducted at $S_{23}$ according to the self-testing program now being held on the RAM 45. The next step $S_{24}$ dictates the retransfer of the whole data from RAM 45 to disk 8b, together with the results of the tests, which are recorded as aforesaid on the blank $A_{33}$ as of the disk. The program ends at $S_{24}$.

Preferably, the test results may be visually indicated by the pilot lamp 53, FIG. 1. The lamp may keep glowing to indicate a good test result, and blink to indicate a bad one. The user is of course free to read the test results on the self-testing disk.

Notwithstanding the foregoing detailed disclosure it is not desired that the present invention be limited by the exact showing of the drawings or the description thereof. A variety of modifications, alterations and adaptations of the illustrated embodiments will manifest themselves to one skilled in the art on the basis of this disclosure, such as the following:

1. The firmware upgrading program may be modified to check the firmware on the disk for correctness before transferring it to the USB interface EEPROM.

2. Upon completion of firmware rewriting, a log file may be opened on the firmware disk for recording the fact.

3. The startup routine may begin when a disk is loaded on the turntable, with the system or the FDD already powered on, instead of when it is powered on as in the illustrated embodiments.

4. In the firmware upgrading program flowcharted in FIGS. 5 and 6, the steps $S_{10}$ and $S_{11}$, which come after the transfer of the firmware from disk to RAM, could be prewritten on the disk rather than on the ROM.

5. The self-testing disk could be put to use not only with the self-powered FDD of FIG. 1 but also with the bus-powered FDD of FIG. 7, with only a power bus connected between USB hub 3 and FDD 5 for self-testing.

6. The invention is applicable to computer systems wherein the computer is linked to peripherals via interfaces, Including a parallel interface, other than the USB. Whether the peripheral is linked to the computer or not may be determined on the basis of the presence or absence of the signal from the computer, as in the first described embodiment of the invention.

7. The invention is applicable to peripherals other than FDDs, examples being CD-ROM drives, optical disk drives, magneto-optical disk drives, and magnetic tape transports.

All these and other modifications and adaptations are intended in the foregoing disclosure, It is therefore appropriate that the present invention be construed broadly and in a manner consistent with the fair meaning or proper scope of the attached claims.

What is claimed is:

1. A data storage device to be connected to a computer via connector means, for interchangeable use with a first kind of storage medium for storing data used by the computer and a second kind of storage medium storing data not used by the computer, the data storage device comprising:

(a) data transfer means for data transfer with the first or the second kind of storage medium as these media are interchangeably loaded in the data storage device, the data transfer means being capable of at least reading the first or the second kind of storage medium;

(b) means for determining whether or not the data storage device is connected to the computer in terms of data transmission, in order to permit the data storage device to operate under the control of the computer when the data storage device is determined to be connected to the computer;

(c) means for identifying the storage medium loaded in the data storage device; and (d) means for causing the data transfer means to read the loaded storage medium when the data storage device is determined to be not connected to the computer and, at the same time, when the loaded storage medium is identified as being of the second kind.

2. The data storage device of claim 1 further comprising power sensing means for sensing the start of power delivery to the data storage device, the determining means being connected to the power sensing means to start determination of whether the data storage device is connected to the computer in response to the start of power delivery to the data storage device.

3. The data storage device of claim 1 wherein the determining means include a timer for determining the connection or nonconnection of the data storage device to the computer on the basis of a signal received from the computer during a preassigned length of time as measured by the timer.

4. A data storage device to be connected to a computer via connector means, for interchangeable use with a data storage medium and one or more prescribed software storage media, the data storage device comprising:

(a) data transfer means for data transfer with a data storage medium or a software storage medium as these media are interchangeably loaded in the data storage device, the data transfer means being capable of at least reading the data storage medium or the software storage medium;

(b) means for determining whether or not the data storage device is connected to the computer in terms of data transmission, in order to permit the data transfer means- to make data transfer with the data storage medium under the control of the computer when the data storage device is determined to be connected to the computer;

(c) means for identifying the loaded storage medium when the data storage device is determined to be not connected to the computer; and (d) means for causing the data transfer means to read the loaded storage medium when the data storage device is determined to be not connected to the computer and, at the same time, when the loaded storage medium is identified as a prescribed software storage medium.

5. A data storage device to be connected to a computer via connector means, for interchangeable use with a data storage medium and a firmware storage medium, the latter holding a new version of interfacing firmware, the data storage device comprising:

(a) data transfer means for data transfer with a data storage medium or a firmware storage medium as these media are interchangeably loaded in the data storage device, the data transfer means being capable of at least reading the data storage medium or the firmware storage medium;

(b) interface means including an erasable, programmable memory on which is stored an old version of interfacing firmware for adapting the data storage device to the computer;

(c) means for determining whether or not the data storage device is connected to the computer in terms of data transmission, in order to permit the data transfer means to make data transfer with the data storage medium under the control of the computer when the data storage device is determined to be connected to the computer;

(d) means for identifying the loaded storage medium as a firmware storage medium when the data storage device is determined to be not connected to the computer; and (e) means for replacing the old firmware version on the memory of the interface means by the new version on the firmware storage medium when the data storage device is determined to be not connected to the computer and, at the same time, when the loaded storage medium is identified as a firmware storage medium.

6. A data storage device to be connected to a computer via connector means, for interchangeable use with a data storage medium and a self-testing program storage medium, the latter medium having prewritten thereon a set of tests to be conducted on the data storage device, the data storage device comprising:

(a) data transfer means for data transfer with a data storage medium or a self-testing program storage medium as these media are interchangeably loaded in the data storage device;

(b) means for determining whether or not the data storage device is connected to the computer in terms of data transmission, in order to permit the data transfer means to make data transfer with the data storage medium under the control of the computer when the data storage device is determined to be connected to the computer;

(c) means for identifying the loaded storage medium as a self-testing program storage medium when the data storage device is determined to be not connected to the computer; and (d) means for performing the set of tests according to the program on the self-testing program storage medium when the data storage device is determined to be not connected to the computer and, at the same time, when the loaded storage medium is identified as a self-testing program storage medium.

7. In a computer system having a data storage device connected to, and disconnected from, a computer, a method of making interchangeable use of the data storage device both with a data storage medium for holding data for use by the computer and with one or more prescribed software storage media for holding softwares for use by the data storage device, which method comprises:

(a) connecting the data storage device to the computer for use of a data storage medium;

(b) disconnecting, at least as far as data transmission is concerned, the data storage device from the computer for use of a software storage medium;

(c) determining whether or not the data storage device is connected to the computer in terms of data transmission;

(d) causing the data storage device to operate under the control of the computer when the data storage device is determined to be connected to the computer;

(e) identifying the storage medium currently loaded in the data storage device when the data storage device is determined to be not connected to the computer; and (f) reading the currently loaded storage medium if the same is identified as a prescribed software storage medium.

8. The method of claim 7 wherein the determination of whether the data storage device is connected to the computer or not is triggered off when at least the data storage device is powered on.

9. The method of claim 7 wherein whether or not the data storage device is connected to the computer in terms of data transmission is determined on the basis of a signal supplied from the computer to the data storage device during a prescribed period of time.

10. In a computer system having a data storage device connected to, and disconnected from, a computer, the data storage device being for use with a data storage medium for holding data used by the computer, a method of upgrading or otherwise rewriting firmware for adapting the data storage device to the computer, which method comprises:

(a) providing an interface having an erasable, programmable nonvolatile memory for holding an old version of firmware;

(b) providing a firmware storage medium holding a new version of firmware, the firmware storage medium being capable of interchangeable use with the data storage medium;

(c) connecting the data storage device to the computer for use of a data storage medium; (d) disconnecting, at least as far as data transmission is concerned, the data storage device from the computer for use of a firmware storage medium;

(e) determining whether or not the data storage device is connected to the computer in terms of data transmission;

(f) causing the data storage device to operate under the control of the computer when the data storage device is determined to be connected to the computer;

(g) identifying the storage medium currently loaded in the data storage device when the data storage device is determined to be not connected to the computer; and (h) replacing, if the currently loaded storage medium is identified as a firmware storage medium, the old firmware version which has been held on the erasable, programmable nonvolatile memory by the new firmware version on the loaded firmware storage medium.

11. The method of claim 10 wherein the currently loaded storage medium is identified by reading self-identification data written in a prescribed location on the storage medium.

12. In a computer system having a data storage device connected to, and disconnected from, a computer, a method of making interchangeable use of the data storage device both with a data storage medium for holding data for use by the computer and with a self-testing program storage medium having prewritten thereon a set of tests to be conducted on the data storage device, which method comprises:

(a) connecting the data storage device to the computer for use of a data storage medium;

(b) disconnecting, at least as far as data transmission is concerned, the data storage device from the computer for use of a self-testing program storage medium;

(c) determining whether or not the data storage device is connected to the computer in terms of data transmission;

(d) causing the data storage device to operate under the control of the computer when the data storage device is determined to be connected to the computer;

(e) identifying the storage medium currently loaded in the data storage device when the data storage device is determined to be not connected to the computer;

(f) transferring, if the currently loaded storage medium is identified as a self-testing program storage medium, the self-testing program from the storage medium to an internal memory of the data storage device; and (g) performing the set of tests according to the self-testing program on the memory.

13. The method of claim 12 which further comprises writing, upon completion of the tests, the self-testing program and the results of the tests on the storage medium.

* * * * *